Jan. 15, 1963   R. BRAREN   3,073,184
PLANETARY GEAR

Filed May 10, 1960   3 Sheets-Sheet 1

INVENTOR
RUDOLF BRAREN
BY Dicke, Craig & Freudenberg
ATTORNEYS

United States Patent Office 3,073,184
Patented Jan. 15, 1963

3,073,184
PLANETARY GEAR
Rudolf Braren, Markt Indersdorf, near Munich, Germany
Filed May 10, 1960, Ser. No. 28,101
1 Claim. (Cl. 74—804)

The present invention relates to improvements in planetary gears, and more particularly in a planetary gear with a fixed gear ratio and coaxial driving and driven shafts, and provided with at least one intermediate gear wheel with outer gear teeth which is driven by an eccentric member on the drive shaft and carries out a cycloidal movement along an outer gear element with inner gear teeth which is likewise disposed coaxially with the shafts and may be mounted, for example, on the gear housing.

The eccentrically movable intermediate gear wheels of planetary gears of this type produce considerable centrifugal forces which cause increasing difficulties the more the speed of operation of the gear is increased. Actually, in planetary gears as designed prior to this invention, these centrifugal forces limited the speed at which the gears could be driven.

It is an object of the present invention to provide a planetary gear of the above-mentioned type which may be operated at a much higher speed than that at which similar previous gears could be driven.

A further object of the invention is to provide a planetary gear of the mentioned type which operates much more quietly and with less vibration than similar previous gears, either at the speeds at which those prior gears could be driven or even while running at a much higher speed than that which was previously attainable.

For attaining these objects, the present invention provides a planetary gear which is designed similar to the known gears of this type insofar as one or more intermediate gear wheels is rotatably mounted on an eccentric member on the drive shaft of the gear so that each intermediate wheel will carry out a cycloidal movement along a surrounding outer gear rim with inner gear teeth which has a diameter in accordance with the desired fixed gear ratio of the gear. According to the present invention, each intermediate gear wheel of the planetary gear, the teeth of which may, for example, be of the involute type, is further provided with at least one outer cylindrical contact surface which forms the movable centrode and has a diameter equal to the pitch diameter of the gear rim on the intermediate wheel. When the intermediate wheel carries out its cycloidal movement along the outer gear rim, this outer cylindrical surface will engage with and roll along the inner surface of a surrounding hollow cylinder which is mounted on the outer gear rim and has a diameter equal to the pitch diameter of this outer gear rim.

According to another feature of the invention, the eccentric member on the drive shaft of the gear on which the intermediate wheel is rotatably mounted is preferably slidable in a radial direction thereto and pressed by the action of at least one spring toward the instant center, i.e. toward the movable point of engagement of the cylindrical contact surface with the inner surface of the hollow outer cylinder.

By providing such a structure, the centrifugal forces of the intermediate gear wheel will be fully taken up by the hollow outer cylinder which, together with the outer gear rim, may be mounted on or form a part of the gear housing, and these centrifugal forces will not be exerted upon the interengaging gear teeth. If two such intermediate eccentric gear wheels are provided which are turned at an angle of 180° relative to each other, the centrifual forces will also compensate each other so that any vibrations of the gear housing will be eliminated.

These and other objects, features, and advantages of the present invention will become further apparent from the following detailed description thereof, particularly when the same is read with reference to the accompanying drawings, in which—

Figure 1:
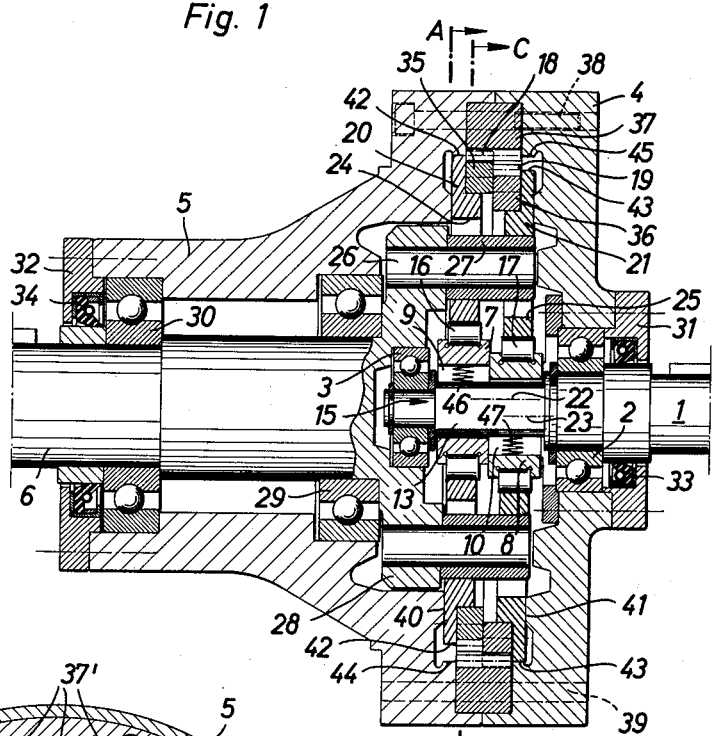
FIGURE 1 shows a cross section of a planetary gear according to the invention, taken in the axial direction thereof.
Figure 6:
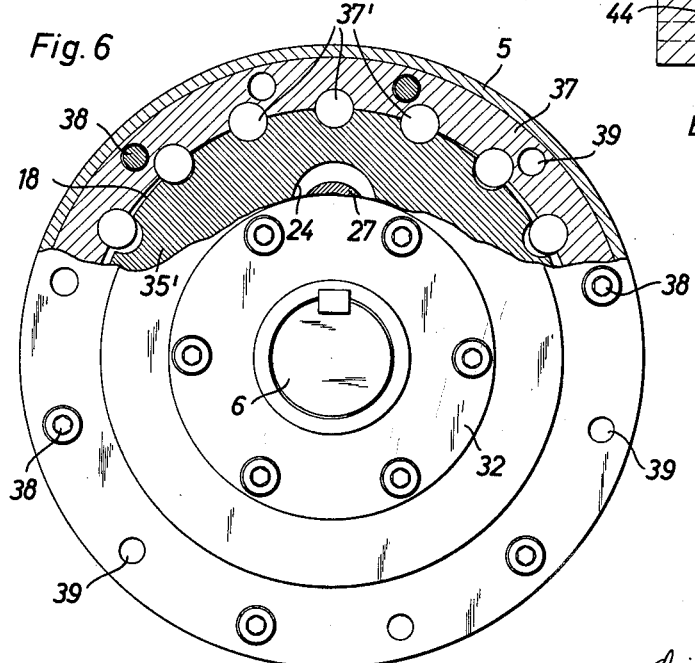
Figure 2:
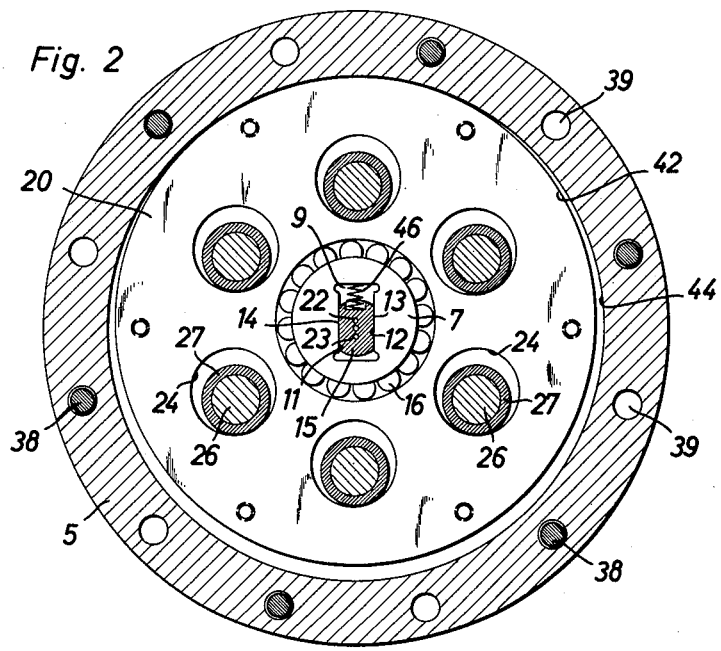
FIGURE 2 shows a cross section of the gear taken in the radial direction along line A—B of FIGURE 1.
Figure 3:
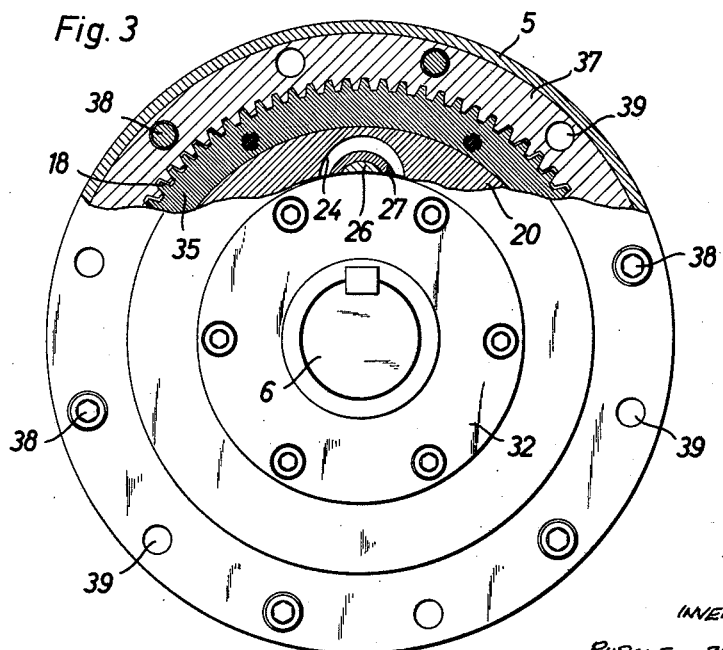
Figure 4:
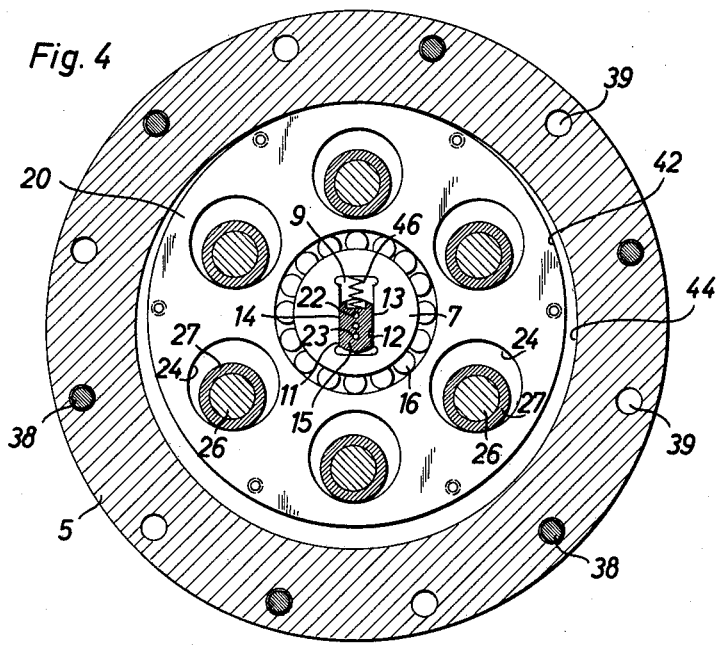
Figure 5:
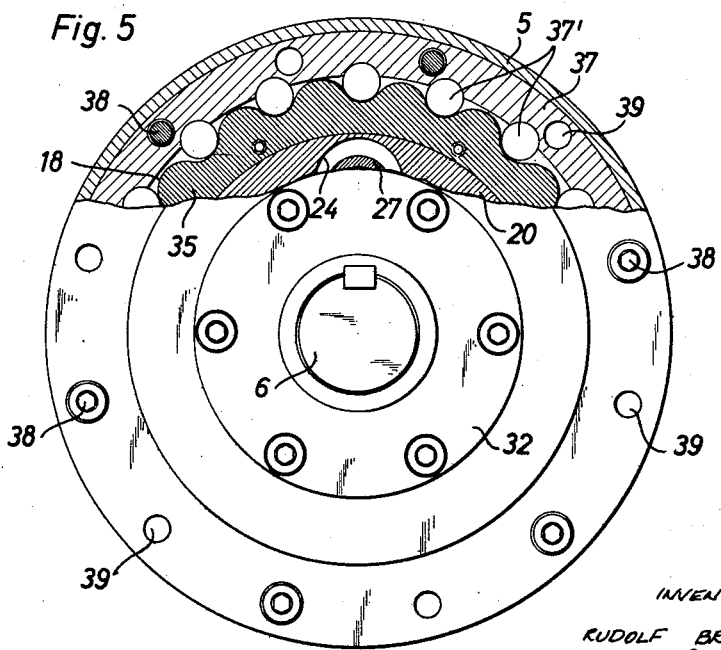

FIGURE 3 also shows a radial cross section of the gear, but taken along line C—C of FIGURE 1;

FIGURE 4 shows a radial cross section similar to FIGURE 2, but illustrates a modification of the gear in which the centrodes have a smaller diameter in accordance with a system of gear teeth as shown in FIGURE 5 forming a closed cycloidal path;

FIGURE 5 shows a cross section taken along line C—C of FIGURE 1, and illustrates the cycloidal tooth system; while FIGURE 6 shows a radial cross section similar to FIGURE 3 taken along line C—C of FIGURE 1, but with mangle-gear teeth and with the centrode being directly associated with the gear teeth.

Referring to the drawings, the planetary gear according to the invention comprises a shaft 1 which is centrally mounted by means of ball bearings 2 and 3 within a two-part housing 4 and 5 and coaxially to a shaft 6. Shaft 1 carries a pair of eccentric members 7 and 8 which are turned at an angle of 180° to each other and are movable in a radial direction of shaft 1. Each eccentric member 7 and 8 has an aperture 9 or 10 therein with opposite parallel side walls 11 and 12 as shown in FIGURE 2, by means of which the respective eccentric member will be guided along the two parallel surfaces 13 and 14 of the flattened reduced portion 15 of shaft 1. Apertures 9 and 10 are made of a shape so as to permit the eccentric members 7 and 8 to move only in a radial direction relative to shaft portion 15. Each eccentric member is provided with a peripheral groove in which a series of rollers 16 or 17 are rotatably mounted which, in turn, rotatably support annular disks 20 or 21, each of which has gear teeth 18 or 19 thereon. Each disk 20 and 21 has a plurality of bores 24 or 25 therein which are disposed concentrically about a common axis 22 or 23, respectively. Each of these bores 24 and 25 contains a tubular roller 27 mounted on a pin 26 which is secured in a flange 28 on shaft 6. Shaft 6 is mounted on ball bearings 29 and 30 within the housing part 5. The two ends of housing 4, 5 are closed in the usual manner by covers 31 and 32 which are provided with sealing means 33 and 34 for sealing the housing around shaft 1 and 6 toward the outside.

According to the embodiments of the invention as shown in FIGURES 1 to 5, each disk 20 and 21 has a ring 35 or 36 secured thereto by screws which carries outer gear teeth 18 or 19 and thus forms a gear rim on on each disk. These gear teeth of both rings 35 and 36 engage with the internal gear teeth of a ring 37 which is secured between the two housing parts 4 and 5, for example, by bolts 38 which also secure the two parts of the housing to each other. While according to the embodiment of the invention as shown in FIGURE 3, the outer gear teeth 18 and 19 on rings 35 and 36 and the inner gear teeth on ring 37 are of standard type, the modified embodiments according to FIGURES 5 and 6 show the inner gear teeth on ring 37 in the form of pins 37'. The modification according to FIGURE 6 differs further from the embodiments according to FIGURES 3 and 5 by the fact that disk 20 or 21 and gear ring 35 or 36 are combined into an integral disklike member 35' which is provided along its outer periphery with recesses of a semicircular cross section forming intermediate teeth 18. Additional bores 39 may also be provided in the two housing parts 4 and 5 intermediate the bores containing bolts 38 for mounting the gear housing in a fixed position.

As may be seen in FIGURE 1, the intermediate disks 20 and 21 are prevented from shifting in the axial direction by being in a sliding engagement with each other along the lateral surfaces of gear rings 35 and 36 and by also slidably engaging with their outer surfaces along annular surfaces 40 and 41 of housing parts 4 and 5.

Each of the two disks 20 and 21 or 35' is provided with an external cylindrical peripheral surface 42, 43, or 43' which is concentrical to its axis 22 or 23, respectively, and engages with an internal cylindrical peripheral surface 44, 45, or 45', respectively, which is provided in housing parts 4 and 5 and extends concentrically to the axis of rotation of shaft 1. Consequently, if one of the shafts 1 or 6 rotates, surfaces 42, 43, or 43' will roll along surfaces 44, 45, or 45', respectively, so that the centrifugal forces of disks 20, 21, or 35' will be taken up by the housing 4, 5.

It will be evident from the embodiments of the invention as illustrated that gears 35, 36, and 37 may not only be provided with involute teeth but just as well with other types of teeth, for example, cycloidal teeth, and that suitable supporting surfaces may be provided on one or both sides of the gear teeth and even between them.

If in place of involute teeth a different type of teeth is used, for example, cycloidal teeth, it is advisable to provide resilient elements, such as springs 46 and 47, between the shaft portion 15 and the eccentric members 7 and 8, respectively. Due to these springs it is possible when the gear unit is at a stop or starting to run, that is, when there are as yet no centrifugal forces, to maintain the gear rims 35 and 36 on the disklike members 20 and 21 in engagement with gear rim 37.

Depending upon the particular purpose of the gear unit, one or two of the parts 1, 6, or 4, 5 of the gear unit may be driven. Although in some cases a single intermediate gear wheel might sufficie, it is more preferable to use two such gear wheels which are turned at an angle of 180° relative to each other so that the centrifugal forces which are taken up by the gear housing 4, 5 will compensate each other and no vibrations of the gear housing will occur.

Although my invention has been illustrated and described with reference to the preferred embodiments thereof, I wish to have it understood that it is in no way limited to the details of such embodiments, but is capable of numerous modifications within the scope of the appended claim.

Having thus fully disclosed my invention, what I claim is:

A planetary gearing comprising a drive shaft and a driven shaft coaxial with each other, a housing supporting said shafts, means drivably connecting said shafts comprising at least one eccentric member carried by said drive shaft, an intermediate member having peripheral teeth mounted on said one eccentric member, an external cylindrical surface on said one intermediate member having a diameter equal to the pitch diameter of said teeth, a ring of internal gear teeth supported in said housing, said housing being provided with an internal cylindrical surface therein of a diameter equal to the pitch diameter of said internal gear teeth but greater than the diameter of said external cylindrical surface, said one eccentric member comprising spring means effective to urge said one intermediate member in directions radial of said drive shaft.

References Cited in the file of this patent
UNITED STATES PATENTS

| | | |
|---|---|---|
| 321,117 | Landis | June 30, 1885 |
| 1,874,890 | Burton | Aug. 30, 1932 |
| 2,013,468 | Klocke | Sept. 3, 1935 |
| 2,666,345 | Amberg | Jan. 19, 1954 |
| 2,908,179 | Taylor | Oct. 13, 1959 |